June 25, 1963    J. DETHLOFF ETAL    3,095,566
METHOD AND APPARATUS FOR PREVENTING COLLISIONS BETWEEN VEHICLES
Filed Aug. 10, 1959    3 Sheets-Sheet 1

June 25, 1963    J. DETHLOFF ETAL    3,095,566
METHOD AND APPARATUS FOR PREVENTING COLLISIONS BETWEEN VEHICLES
Filed Aug. 10, 1959    3 Sheets-Sheet 2

INVENTORS
Jürgen Dethloff
Heinz Matusche
BY Michael S. Striker
ATTORNEY

June 25, 1963  J. DETHLOFF ETAL  3,095,566
METHOD AND APPARATUS FOR PREVENTING COLLISIONS BETWEEN VEHICLES
Filed Aug. 10, 1959  3 Sheets-Sheet 3

INVENTORS
Jürgen Dethloff
Heinz Matusche
BY
Michael S. Striker
ATTORNEY.

United States Patent Office 3,095,566
Patented June 25, 1963

3,095,566
METHOD AND APPARATUS FOR PREVENTING COLLISIONS BETWEEN VEHICLES
Jürgen Dethloff, Avenariusstrasse 30, Hamburg-Blankenese, Germany, and Heinz Matusche, Borsteler Chaussee 186, Hamburg, Germany
Filed Aug. 10, 1959, Ser. No. 832,575
Claims priority, application Germany Aug. 8, 1958
13 Claims. (Cl. 343—106)

The present invention concerns a method and apparatus for the prevention of collisions between moving aerial or maritime vehicles.

Up to now, systems, for preventing collisions between vehicles of the type set forth under conditions of poor or entirely obstructed visibility are based on radar. However, it has been found that use of radar for this purpose is not entirely reliable, particularly under severe weather conditions, like heavy rain, snow, sleet or hail. The radar signals are severely weakened by the precipitative substances in the air, and are again weakened after reflection at the target vehicle by the above mentioned substances on the way back to the radar transmitter. Therefore, the indications obtainable by radar under such circumstances frequently are not sufficient clearly to determine the existence of danger of collision.

It is therefore a main object of this invention to provide for a method and apparatus which avoids the above mentioned drawbacks of the radar system by being based entirely on radio transmission and reception which is never hampered by atmospheric conditions which are likely to affect radar transmission and reception.

It is a further object of this invention to provide for a method and apparatus of the type set forth which yields after a predetermined time of observation of signals transmitted by one vehicle and received by the other vehicle, a reliable information about the existence of danger of collision.

It is still another object of this invention to provide for a method and apparatus of the type set forth which yields without any time delay for continuous observation an instantaneous indication whether the speeds and directions of movement of two vehicles, respectively, entail the danger of collision.

With the above objects in view, one aspect of this invention, a method of preventing collisions between moving aerial or maritime vehicles, comprises the steps of transmitting from one of the vehicles as a first signal a wireless signal beam of rotationally varying angular direction in a substantially horizontal plane and determined as the angle between the direction of that beam and the direction of movement of that one vehicle, said first signal having a varying message characteristic functionally indicative of the product of the velocity of movement of said one vehicle and of the momentary values of the sine of said varying angle; receiving said wireless signal aboard another one of the vehicles at amplitudes varying between zero and a maximum depending upon the varying angular direction of said beam; producing aboard said other vehicle a second signal having a varying characteristic functionally indicative of the product of the velocity of movement of said other vehicle and of the momentary values of the sine of varying positional angles cyclically increasing between zero and 360° in a substantially horizontal plane with the direction of movement of said other vehicle as zero direction and increasing in a circular direction opposite to the direction of increase of the varying directional angle of said signal beam; indicating aboard said other vehicle, at the moment of reception of said first signal transmitted from said one vehicle, said message characteristic indicative of said product of the velocity of movement of said one vehicle and the momentary value of the sine of the directional angle of said signal beam; and indicating aboard said other vehicle at the same moment said characteristic of said second signal indicative of the product of the momentary value of said positional angle and of the velocity of movement of said other vehicle, whereby danger of collision is indicated if the indication of said first mentioned product is substantially equal to the indication of said last mentioned product.

In a further aspect of this invention, an apparatus for the prevention of collisions between moving aerial or maritime vehicles comprises, in combination, first speed indicator means for determining the speed of movement of one of said vehicles; transmitter means installed on said one vehicle including a continuously rotating unidirectional antenna for transmitting a first signal as a beam of varying angular direction in a substantially horizontal plane and determined as the angle between the direction of said beam and the direction of movement of said one vehicle, and including first modulating means controlled by said first speed indicator means and by said rotating antenna for modulating a carrier frequency with a modulating frequency varying in predetermined proportion to the product of the speed of movement of said one vehicle and of the sine of said varying angle; receiver means installed aboard another one of the vehicles for receiving said first signal at amplitudes varying between zero and a maximum depending upon the varying angular direction of said beam; second speed indicator means for determining the speed of movement of said other vehicle; generator means aboard said other vehicle for producing a second signal having a carrier frequency; angle determining means aboard said other vehicle including a continuously rotating control element moving cyclically through angular positions increasing between positional angles varying from zero to 360° in a substantially horizontal plane with the direction of movement of said other vehicle as zero direction and increasing in a rotational direction opposite to the direction of increase of the varying directional angle of said signal beam; second modulating means connected with said generator means and controlled by said second speed indicator means and by said control element for modulating the carrier frequency of said second signal in a predetermined proportion to the product of the speed of movement of said other vehicle and of the sine of said varying positional angle; frequency comparison means connected with said receiver means and with the output of said generator means for comparing at the moment of reception of a maximum of said first signal, the momentary modulation frequency thereof with the momentary modulation frequency of said second signal, substantial equality of said modulation frequencies indicating danger of collision between said vehicles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

Fundamentally, the present invention is generally based on the idea that an exact determination of the position of a second vehicle, i.e. an exact determination of its distance from a first vehicle and of the direction of the position of the second vehicle with respect to a reference line in the first vehicle, is generally not necessary for determining the danger of collision. This concept can be best explained by reference to FIG. 1. This diagram shows a so called collision triangle A, B, C. It may be assumed that a first vehicle is located at a time $t_0$ at point A and moves with a velocity or speed $v_1$ toward the point C. A second vehicle is located at the same time $t_0$ at the point B and moves with a speed $v_2$ also in a direction toward the point C. The point C is the potential point of collision. This point C will be reached by both vehicles at the same time provided that the first vehicle arrives at a time $t_1$ at the point D while the second vehicle arrives as the same time at the point E.

Figure 1:
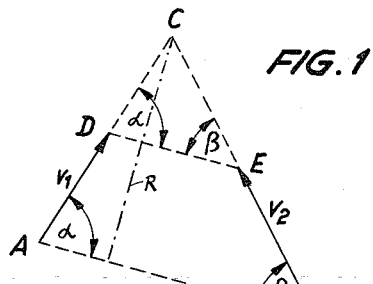
FIG. 1 is a geometrical diagram for explaining the basis of a method and apparatus for preventing collisions between moving aerial or maritime vehicles.
Figure 4:
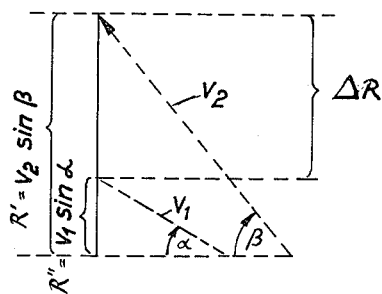
FIG. 4 is another geometrical diagram referring to the method and to the apparatus of this invention.

The diagram of FIG. 1 taken together with the diagram of FIG. 4, furnishes the basis for the system of collision prevention of this invention. By applying an arbitrary scale, it can be stated that the side AC of the collision triangle represents the velocity or speed $v_1$ of the first vehicle while similarly the side BC represents at the same scale the velocity or speed $v_2$ of the second vehicle. By inserting the perpendicular R from C on the base AB of the triangle, one can immediately establish the equation $$R = v_1 \cdot \sin \alpha = v_2 \cdot \sin \beta$$

Consequently, danger of collision can be defined as existing whenever the product of the speed of one vehicle multiplied by the sine of its directional angle $\alpha$ is, at a given moment, equal to the product of the speed of the other vehicle multiplied by the sine of its positional angle $\beta$. FIG. 4 illustrates this statement for an example where there is no danger of collision because the product R' referring to the one vehicle differs from the product R'' referring to the other vehicle by a difference $\Delta R$.

Consequently, in a system based on the just described concept, the first vehicle has to transmit to the second vehicle a signal containing a characteristic indicative of the product $v_1 \cdot \sin \alpha$ by means of a rotating directional beam, while the second vehicle has to receive this signal by means of a quickly contra-rotating directional antenna when the beam is directed to it, while additionally on the second vehicle, a signal is produced having a characteristic indicative of the second product $v_2 \cdot \sin \beta$ so that it is only necessary to compare on the second vehicle the first and the second product as indicated by said characteristics, at the moment when the signal transmitted from the first vehicle is received. If the two products are equal then the above equation is applicable and danger of collision exists on the basis of the prevailing velocities and directions of movement of the two vehicles. It is evident that in this case the direction or speed or both of the second vehicle have to be changed in order to avoid collision.

Since speed indicators both for naval vessels and for aircraft are well known, it does not appear to be necessary to describe in any detail such instruments, it being evident that the required indications or controls in proportion to the actual speed of either one of the vehicles can be derived from such speed indicators in a more or less conventional manner.

In carrying out the method, it is advisable that the first vehicle transmits a constant carrier frequency $a$ which is modulated by a modulating frequency $k \cdot v_1 \cdot \sin \alpha$, wherein the coefficient $k$ is some arbitrary proportionality factor. Consequently, the signal transmitted from the first vehicle can be represented as $f_1 = a + k \cdot v_1 \cdot \sin \alpha$. On the second vehicle, a comparison signal which is similarly composed of a carrier frequency and a modulation frequency proportional to the product $v_2 \cdot \sin \beta$ can be written as $f_2 = a + k \cdot v_2 \cdot \sin \beta$. By comparing at a given moment, when the transmitted signal is received, the two frequencies containing respectively the two products, it can be determined whether there exists a difference between the frequencies $f_1$ and $f_2$, i.e. between said products.

Figure 2:
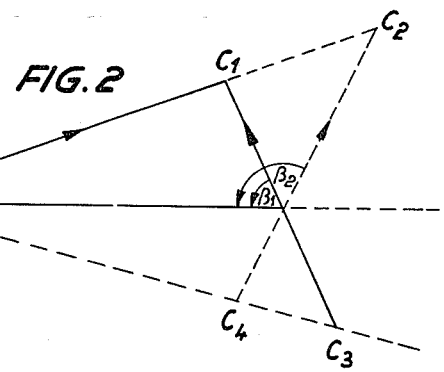
FIG. 2 is a geometrical diagram for explaining the basis of the method and the apparatus of this invention.

In order to avoid difficulties, it is recommended to choose the constant carrier frequency $a$ in such a manner that it is higher than the maximum values of said modulation frequencies, because otherwise harmonics may be developed in the receiver system or in the comparison means, and also the maximum of a modulation frequency may practically reduce the amplitude of the carrier frequency to zero. In addition, by using a constant carrier frequency as mentioned above, a further advantage is obtained. It is well known that a numerical value of the sine of an angle is ambiguous because the same numerical value may correspond to four different angles appearing in the four 90° sectors of a circle. However, in the present case, the ambiguity is reduced to two possibilities because the negative sine values are clearly distinct from the corresponding positive values. If the arrangement in carrying out the method according to the invention is made in such a manner that the zero values of the angles $\alpha$ and $\beta$ are assigned to, or coincide with, the forward direction of movement of the respective vehicle, and if further the directional angle $\alpha$ at the transmitter station is caused to increase in clockwise direction while at the receiver station the measurement or indication of the positional angle $\beta$ is caused to increase in counterclockwise direction, then, as can be proven from the diagram of FIG. 2, only two possibilities of collision will be indicated for a particular pair of vehicle speeds $v_1$ and $v_2$, respectively. As is evident, $$\sin \alpha_1 = \sin \alpha_2 = \sin (\pi - \alpha_1)$$

and $$\sin \beta_1 = \sin \beta_2 = \sin (\pi - \beta_1)$$

Consequently, there are four cases of possible collision but only two of these cases are realistic.

(1) The two angles $\alpha_1$ and $\beta_1$ indicate collision at the point $C_1$;

(2) The two angles $\alpha_1$ and $\beta_2$ indicate collision in the point $C_2$;

(3) The two angles $\alpha_2$ and $\beta_1$ would have caused collision of the two vehicles already in the point $C_3$;

(4) The two angles $\alpha_2$ and $\beta_2$ would have caused collision of the two vehicles already at the point $C_4$.

Since the points $C_3$ and $C_4$ are not in the forward direction of the movement of the respective vehicles, these possibilities can be discarded as being unrealistic.

Now, it would be wrong to conclude that the method according to the invention is ambiguous because actually two possible points of collision $C_1$ and $C_2$ would be possible on the basis of the values of the sines of the directional and positional angles. It must be borne in mind that the method does not aim at determining the actual value of these two angles or to locate the point of possible collision, but only at obtaining a warning if any collision at any point must be expected unless at least one of the involved vehicles changes its speed or direction of movement. Therefore, it is of no interest whatsoever where the possible collision point is located and whether it might be the point $C_1$ or the point $C_2$.

It is advisable to operate the transmitter means in an apparatus embodying this invention at comparatively high frequencies, for instance in the range between 5,000 and 10,000 megacycles. This is recommended for two reasons, first, because high frequencies in this range can be transmitted with comparatively small antennae having a very distinct directional effect, and second, because the extremely short waves corresponding to these frequencies travel substantially only along a straight path so that it is possible to transmit a very narrow beam at a comparatively short range of up to about 30 miles. Such a limitation of range is entirely satisfactory because for the purpose of collision prevention generally only distances within this range are of interest, on the other hand by using these frequencies over a comparatively short range, no other transmitters or receivers of other kinds or of the same kind on other vehicles at greater distances will be affected or interfered with.

It is further recommended to vary the modulating frequency only within a band width amounting to not more than 1.9 times the frequency of the carrier frequency so that the development of harmonics of the carrier frequency is avoided. This would be highly undesirable if in the receiver equipment detector means or frequency comparison means would be used which are of the resonance type.

Preferably, as a transmitting antenna an unsymmetrical quasi-cylindrical wave radiator of parabolic cross section, similar to radar antennae is used so that the signal beam has an extremely small angular extension in horizontal direction, while its vertical spread may be somewhat larger.

It should be noted that it is generally advisable that at least one of the vehicles involved are equipped both with transmitting and receiving means according to the invention. In this manner, it is possible that at least one of the vehicles can check on the danger of collision.

Instead of a constant carrier frequency in the signal beam carrying in some form the message characteristic, the message characteristic preferably consisting in a modulation frequency applied either to amplitude modulation or frequency modulation, it is also possible to use a conventional pulse transmitter transmitting a fundamental pulse frequency which may be provided with the message characteristic by conventional pulse modulation. This would entail the advantage that the transmitter device can be kept to very small dimensions. The fact that the noise level in the reception of such pulse sequences is comparatively higher than in the case of a modulated carrier frequency is of no detrimental effect in the present case.

Figure 5:
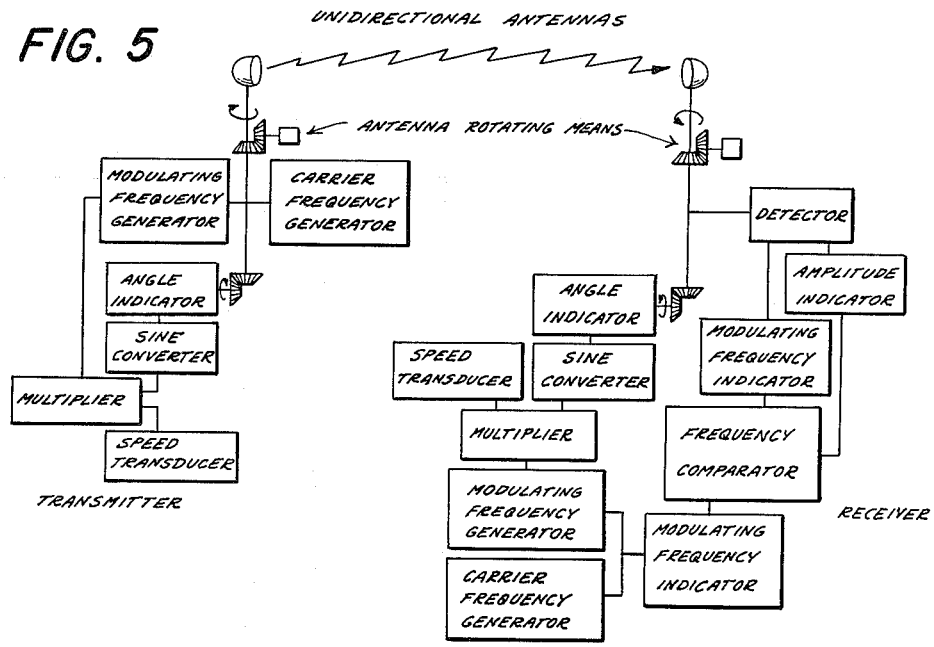
FIG. 5 is a block schematic diagram of apparatus for preventing collision between vehicles in accordance with the invention.
Figure 6:
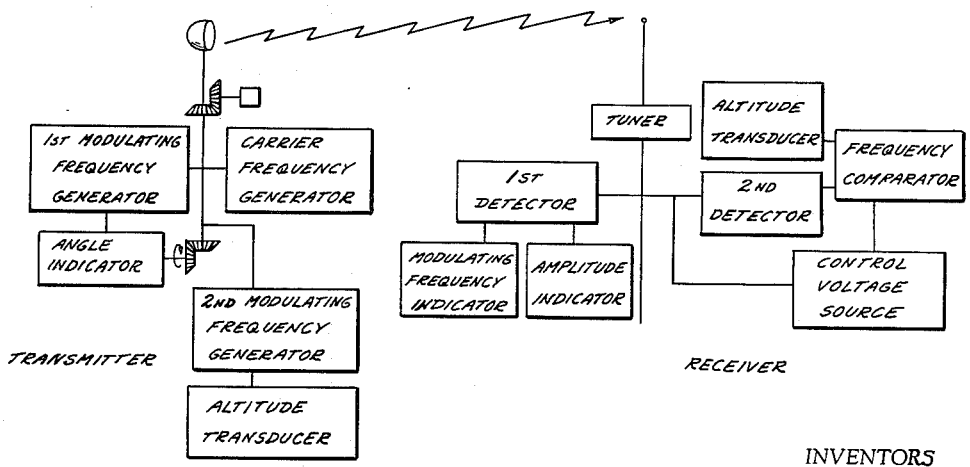
FIG. 6 is a block schematic diagram showing a modification of the apparatus shown in FIG. 5.

If the system according to the invention is applied to air traffic, it is advisable to take into consideration not only the speed and direction of flight of two aircraft but also the height of flight thereof. In this case, it is advisable not only to transmit from the one vehicle a signal containing a message characteristic indicative of the product of the speed of the one vehicle and the sine of that directional angle as shown in FIG. 5, but also a signal indicative of the height of flight of said one vehicle as shown in FIG. 6. For this purpose, the transmitter may be provided with means for applying to the carrier frequency of the transmitted signal a second modulation frequency in a predetermined proportion to the actual height of flight of the one vehicle. The modulating device for this second modulation frequency may be directly controlled from conventional height indicator devices carried by the one vehicle. In this case, the other vehicle would be equipped with second detector means for detecting the above mentioned second modulation frequency in the received signal, and with frequency comparator means operatively connected with the second detector means and with conventional altitude indicator means on the second vehicle, the frequency comparator means furnishing a control voltage whenever comparison of the second modulation frequency with an indication derived from the altitude indicator means of that second vehicle would show a substantial difference of the respective height of flight of the two vehicles. In addition, there would be control means connected with the just described equipment for being influenced by the just mentioned control voltage and for rendering inoperative the detector means on the second vehicle when the vehicles travel at substantially different heights.

On the other hand, the same purpose can be achieved if the transmitter means on the one vehicle comprise tuning means operatively connected with a conventional altitude indicator on that vehicle in such a manner that the carrier frequency of the transmitted signal is varied in a predetermined proportion to the height of the flight of that vehicle, while the second vehicle carries receiver means including a tuning device operatively connected with a conventional altitude indicator means on this second vehicle for tuning the receiver to a signal carrier frequency in the same predetermined proportion related to the height of flight of that vehicle, so that the signal is received by the receiver means only if both vehicles are travelling at substantially the same height as indicated by the carrier frequencies being substantially identical. It may be necessary to standardize internationally permissible differences between carrier frequencies adjusted in the manner above described so that the apparatus according to the invention would remain operative as long as the difference in the altitude of the two vehicles remains within such permissible limits.

In an apparatus adapted for carrying out the method in which the one vehicle transmits a signal beam containing a message characteristic indicative of a product of the speed of that vehicle multiplied with its directional angle as defined above, the transmitter device is preferably also equipped with a continuously rotating unidirectional antenna for transmitting a carrier frequency modulated by a modulating frequency varying in proportion with the product $v_1 \cdot \sin \alpha$.

Figure 3:
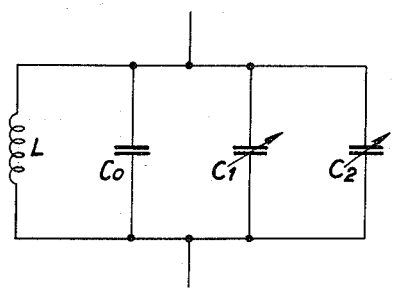
FIG. 3 is a circuit diagram illustrating modulating means used in one embodiment of the invention.
Figure 8:
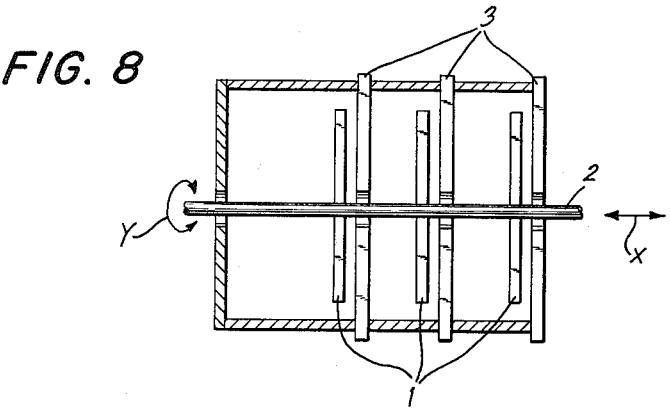
FIG. 8 is a schematic plane view partly in section of a component of the modulating frequency generator of FIG. 5.
Figure 9:
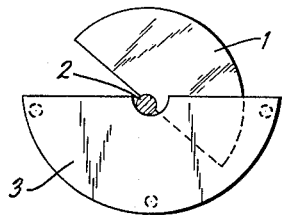
FIG. 9 is an end elevation of the component of FIG. 8.

Frequency modulation may be carried out by an oscillatory circuit in which three capacitance means $C_0$, $C_1$ and $C_2$ are connected in parallel with each other and with an inductance means L, as shown in FIG. 3. The capacitance means $C_0$ may be a fixed capacitor, while the other two capacitance means $C_1$ and $C_2$ may be variable capacitors. The capacitor $C_1$ may be adjustable by hand or automatically while the capacitor $C_2$ is mechanically or otherwise coupled with the rotating antenna so as to be adjusted in proportion to the angle of rotation of the antenna. If one assumes that the capacity of the capacitor $C_0$ is large as compared with the capacity of the capacitor $C_1$, and, in turn, the capacity of the capacitor $C_1$ is large as compared with the capacity of the capacitor $C_2$, then it is possible to adjust the capacitor $C_1$ for tuning the modulating frequency in proportion to the speed of the vehicle, while the adjustment of the capacitor $C_2$ has the effect of tuning the modulation frequency in proportion with the sine of the direction angle $\alpha$, the two adjustments of the last two capacitors resulting in a modulation indicative of the product of the just mentioned two parameters. However, it is also possible to combine the two capacitors $C_1$ and $C_2$ into one capacitor unit having one set of non-rotating plates 3 and one set of rotatable plates 1 cooperating with each other and coaxially mounted on a shaft 2 as seen in FIGS. 8 and 9, one of these sets of plates being rotatable in the directions of the double-headed arrow Y for varying the capacity of the unit and one set being axially adjustable in the direction of the double-headed arrow X for varying the capacity of the unit by varying the spacing between cooperating plates, said set of movable plates being operatively connected with the speed indicating means of the one vehicle for being adjusted to different spacing between cooperating plates depending upon varying speeds of that vehicle, while being operatively connected with the rotating antenna for being rotationally adjusted depending upon the varying directional angle of the antenna so that the angular position of the movable plates is related to the momentary values of the sine of the directional angle. The total effect of the both adjustments of the condenser plates is a tuning of the carrier frequency by a modulation frequency proportional to the product between the speed of that vehicle and the momentary values of the directional angle of the antenna. It should be noted that it is also possible to make both sets of condenser plates, i.e. the stator plates as well as the rotor plates, adjustable in the manner set forth above.

The receiver means on the second vehicle is designed to receive the signal transmitted by the signal beam from the first vehicle and containing the message characteristic indicative of the product $v_1 \cdot \sin \alpha$. However, additionally the equipment on the second vehicle includes means for forming the second product $v_2 \cdot \sin \beta$. For this purpose, there is provided a generator for producing a carrier frequency and a modulating device for modulating this carrier frequency with a modulating frequency indicative of the just mentioned product of the speed of the second vessel and the positional angle $\beta$. The modulator device is controlled in two ways. On one hand, it is controlled by an angle determining device including a continuously rotating control element and rotating directional antenna moving cyclically through angular positions increasing between positional angles $\beta$ varying 0 to 360° in a substantially horizontal plane with the direction of movement of this vehicle as the 0 direction and increasing in a rotational direction opposite to the direction of increase of the varying directional angle $\alpha$ of the transmitted signal beam. On the other hand, the modulating device is controlled by conventional speed indicator means on the second vehicle so that the carrier frequency produced by the last mentioned generator is continuously modulated by a modulating frequency proportional to the product of the speed of movement of that second vehicle and of the sine of the varying positional angle $\beta$.

Figure 7:
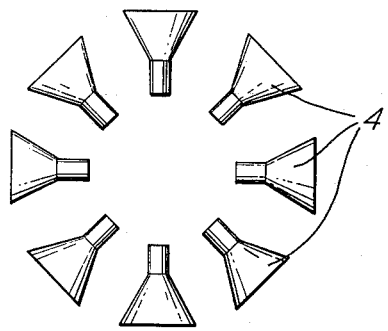
FIG. 7 is a diagrammatic view of an antenna arrangement that may be used in the apparatus of this invention.

In a specific embodiment of this apparatus according to the invention, the receiver may be equipped with a direction-sensitive antenna arrangement comprising a plurality of individual directional antennas, each preferably equipped with an electromagnetic horn 4 as shown diagrammatically in FIG. 7, said directional antennas being arranged along a circle in a substantially horizontal plane with their center lines of directional receptivity extending in radial direction from the center of that circle in such a manner that reception angles of successive directional antennas overlap each other only slightly. Each of these individual directional antennas is operatively connected with diode rectifier means (not shown). In each of these rectifier circuits, a certain voltage is produced whenever a signal is received by the respective directional antenna. If the arriving signal beam from the transmitter is not precisely coaxial with the center line of one particular antenna, different voltages will be produced in adjacent antennas, the ratio between these voltages permitting to determine the actual direction of the arriving signal beam. Arrangements of this particular type are generally known and therefore do not require a more detailed description. It can be seen that although this type of antenna arrangement is capable of receiving signals from any direction at least within a horizontal plane, it is nevertheless suitable for determining exactly the direction from which the received beam is arriving.

As has been stated above, in the apparatus suitable for carrying out the method according to this invention, a message characteristic indicative of the product $v_1 \cdot \sin \alpha$ is transmitted in the form of a modulated carrier frequency $f_1 = a + v_1 \cdot \sin \alpha$ by means of a continuously rotating directional antenna, the rotation being for example in clockwise direction. In a preferred embodiment of this apparatus, the receiving equipment comprises a directional antenna rotating counterclockwise in this example, the speed of rotation being chosen in relation to the rotational speed of the transmitting antenna in such a manner that the receiving antenna completes a full revolution while the transmitting angle has moved through an angle just about equal to or not quite equal to an angle corresponding to the angular width of the signal beam transmitted thereby. Or, on the other hand, the rotational speed of the receiving antenna is chosen in such a manner that it moves angularly through an angle just about equal or rather not quite equal to its reception angle, while the transmitting antenna carries out a full revolution. In this manner, one can be sure that during the time required for a full revolution of the slower antenna, a signal containing the message characteristic is received.

By means of equipment similar to that described further above the apparatus according to this invention is preferably equipped with means for comparing the message characteristic contained in the signal beam from the transmitter and being indicative of the product $v_1 \cdot \sin \alpha$ with the characteristic contained in the modulated carrier frequency at the receiver station and indicative of the product $v_2 \cdot \sin \beta$, the comparison indicating danger of collision if the two products are substantially equal, and indicating no danger of collision if the two products are substantially different from each other. These comparison means are preferably connected with auxiliary equipment capable of automatically causing a change of speed and/or direction of movement of the second vehicle whenever the comparison indicates danger of collision.

It will be understood that the method and apparatus according to the invention can only perform with ideal accuracy if the condition is met that the two vehicles referred to above are travelling each on a straight course and that their absolute speeds are known or are being indicated. Both these conditions can hardly be expected to be met under general circumstances in a manner other than approximately. Nevertheless, the results of the method and of the use of the apparatus according to the invention are considered to be of very high value for sea and air traffic. It may be mentioned that the accuracy of the method and of the operation of the apparatus will not be affected by wind currents in the air traversed by aircraft equipped with this apparatus, or by water currents in which maritime vehicles travel. It being understood that collision danger only exists if the two vehicles in question are not far distant from each other, it can always be assumed that these currents influence both vehicles in the same manner so that these current influences can be entirely disregarded.

It will be understood that each of the elements described above, or two or more together, may also find a useful application in other types of methods and apparatus for preventing collisions, differing from the types described above.

While the invention has been illustrated and described as embodied in a method and apparatus for preventing collisions between moving aerial and maritime vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of preventing collisions between moving aerial or maritime vehicles, comprising the steps of transmitting from one of the vehicles as a first signal a wireless signal beam of rotationally varying angular direction in a substantially horizontal plane and determined as the angle between the direction of said beam and the direction of movement of said one vehicle, said first signal having a varying message characteristic functionally indicative of the product of the velocity of movement of said one vehicle and of the momentary values of the sine of said varying angle; receiving said wireless signal aboard another one of the vehicles by means of a direction finding antenna; producing aboard said other vehicle a second signal having a varying characteristic functionally indicative of the product of the velocity of movement of said other vehicle and of the momentary values of the sine varying positional angles of the direction finding antenna cyclically increasing between zero and 360° in a substantially horizontal plane with the direction of movement of said other vehicle as zero direction and increasing in a circular direction opposite to the direction of increase of the varying directional angle of said signal beam; indicating aboard said other vehicle, at the moment of the reception of said first signal transmitted from said one vehicle, said message characteristic indicative of said product of the velocity of movement of said one vehicle and the momentary value of the sine of the directional angle of said signal beam; and indicating aboard said other vehicle at the same moment said characteristic of said second signal indicative of the product of the momentary value of said positional angle and of the velocity of movement of said other vehicle, whereby danger of collision is indicated if the indication of said first mentioned product is substantially equal with the indication of said last mentioned product.

2. A method as claimed in claim 1, wherein said first signal and said second signal are each composed of a carrier frequency, respectively, and of a modulation frequency, respectively, comprising said varying characteristics, respectively.

3. A method as claimed in claim 2, wherein said modulation frequencies are audio-frequencies carrying sound information about the consecutive momentary values of said characteristics, respectively, and wherein said sound informations are indicated acoustically.

4. A method as claimed in claim 2, wherein said carrier frequencies are substantially identical and are higher than said modulation frequencies, said modulation frequencies varying proportionally with said varying characteristics, respectively.

5. A method as claimed in claim 2, particularly applicable to air traffic, including the step of applying to the carrier frequency of said first signal an auxiliary modulation frequency indicative of the height of flight of said one vehicle, and the step of receiving aboard said other vehicle said first signal including detecting said auxiliary modulation frequency whereby an indication of danger of collision in the case of substantial identity of said first and second product is voided by the detection of an auxiliary modulation frequency indicative of a height of said one vehicle different from that of said other vehicle.

6. In a method as claimed in claim 2, particularly applicable to air traffic, the step of varying said carrier frequency of said first signal transmitted from said one vehicle, said variation being made in a predetermined relation to the height of flight of said one vehicle, and the step of restricting the reception of said first signal to a carrier frequency having the same predetermined relation to the height of flight of said other vehicle whereby the indication of danger of collision is restricted to vehicles traveling at substantially the same height.

7. Apparatus for the prevention of collisions between moving aerial or maritime vehicles, comprising, in combination, first speed indicator means for determining the speed of movement of one of said vehicles; transmitter means installed on said one vehicle including a continuously rotating uni-directional antenna for transmitting a first signal as a beam of varying angular direction in a substantially horizontal plane and determined as the angle between the direction of said beam and the direction of movement of said one vehicle, and including first modulating means controlled by said first speed indicator means and by said rotating antenna for modulating a carrier frequency with a modulating frequency varying in predetermined proportion to the product of the speed of movement of said one vehicle and of the sine of said varying angle; receiver means including a direction finding antenna installed aboard another one of the vehicles for receiving said first signal; second speed indicator means for determining the speed of movement of said other vehicle; generator means aboard said other vehicle for producing a second signal having a carrier frequency; angle determining means aboard said other vehicle including a continuously rotating control element moving the direction finding antenna cyclically through angular positions increasing between positional angles varying from zero to 360° in a substantially horizontal plane with the direction of movement of said other vehicle as zero direction and increasing in a rotational direction opposite to the direction of increase of the varying directional angle of said signal beam; second modulating means connected with said generator means and controlled by said second speed indicator means and by said control element for modulating the carrier frequency of said second signal in a predetermined proportion to the product of the speed of movement of said other vehicle and of the sine of said varying positional angle; frequency comparison means connected with said receiver means and with the output of said generator means for comparing, at the moment of reception of said first signal, the momentary modulation frequency thereof with the momentary modulation frequency of said second signal, substantial equality of said modulation frequencies indicating danger of collision between said vehicles.

8. Apparatus as claimed in claim 7, said first modulating means comprising oscillatory circuit means including inductance means and three capacitance means connected in parallel therewith, one of said capacitance means being of fixed capacity, a second one of said capacitance means being adjustable in proportion to the speed of movement of said one vehicle, and the third one of said capacitance means being operatively connected with said rotating antenna for being adjusted thereby in a predetermined proportion to said directional angle.

9. Apparatus as claimed in claim 8, said second capacitance means being operatively connected with said first speed indicating means for being automatically adjusted thereby in proportion to the speed of movement of said one vehicle.

10. Apparatus as claimed in claim 8, wherein said second and third capacitance means are combined into one variable capacitor unit having a set of stationary plates and a set of movable plates cooperating with each other, one of said sets of plates being rotatable for varying the capacity of the unit, and one set being axially adjustable for varying the capacity of the unit by varying the spacing between cooperating plates, said set of movable plates being operatively connected with said first speed indicating means for being adjusted to different spacing between cooperating plates depending upon varying speeds of said one vehicle, and being operatively connected with said rotating antenna for being rotationally adjusted depending upon the varying directional angle thereof.

11. Apparatus as claimed in claim 7, wherein said receiver means includes antenna means comprising a plurality of directional antennas, each equipped with an electromagnetic horn, said directional antennas being arranged along a circle in a substantially horizontal plane with their center lines of directional receptivity extending in radial direction from the center of said circle in such a manner that reception angles of successive directional antennas overlap only slightly.

12. Apparatus as claimed in claim 7, wherein said receiver means include a rotating directional antenna.

13. Apparatus as claimed in claim 12, including drive means for rotating said rotating antenna of said receiver means at a speed being a multiple of the speed of rotation of said rotating uni-directional antenna of said transmitter means.

References Cited in the file of this patent

UNITED STATES PATENTS

| | | |
|---|---|---|
| 894,318 | De Forest | July 28, 1908 |
| 2,485,582 | Frum | Oct. 25, 1949 |
| 2,498,933 | Wallace | Feb. 28, 1950 |
| 2,568,568 | Stansbury | Sept. 18, 1951 |

FOREIGN PATENTS

| | | |
|---|---|---|
| 686,886 | Great Britain | Feb. 4, 1953 |